UNITED STATES PATENT OFFICE.

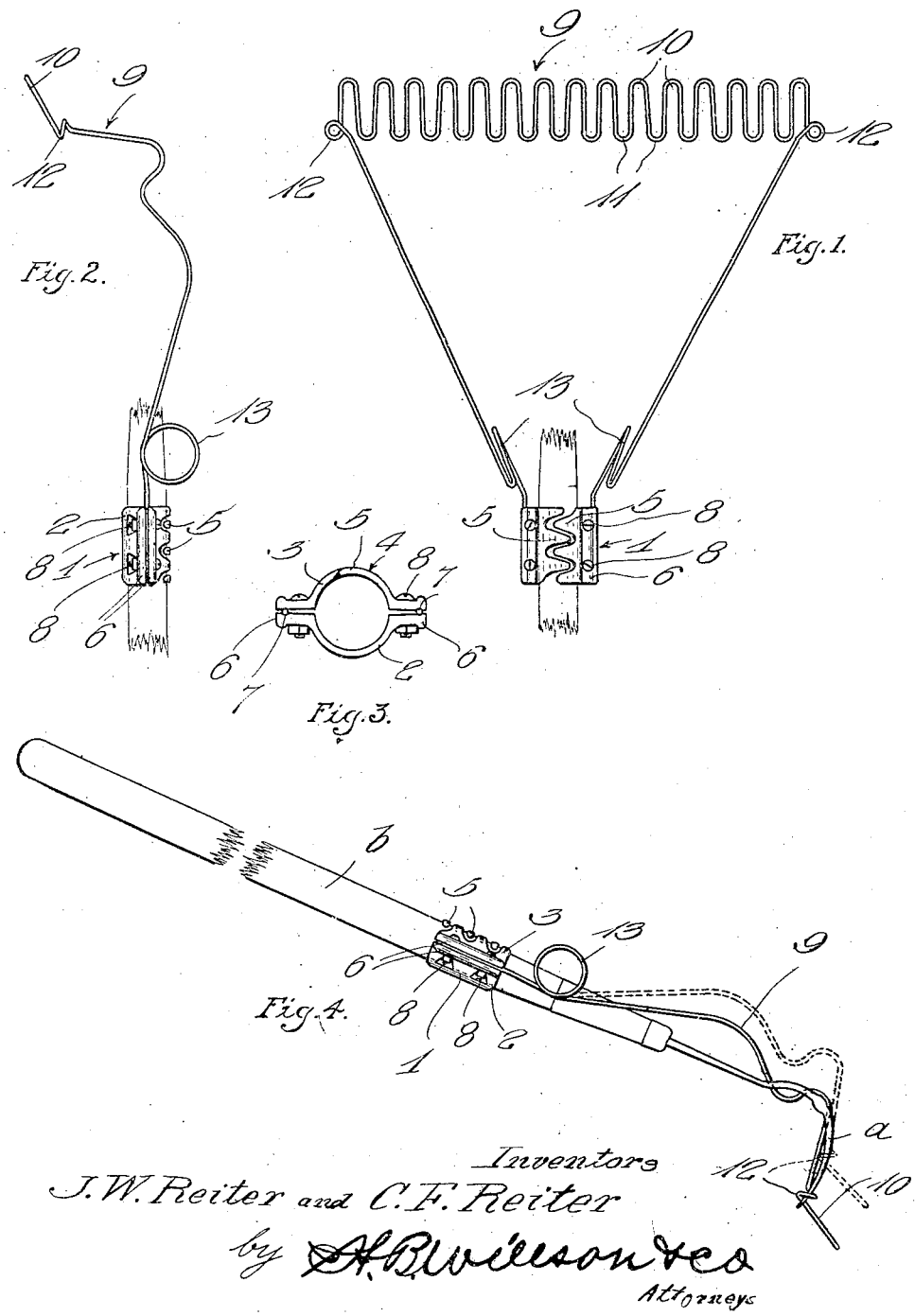

JOSEPH W. REITER AND CHARLES F. REITER, OF MINNEAPOLIS, MINNESOTA.

AUTOMATIC SELF-CLEANING RAKE.

1,251,284.   Specification of Letters Patent.   Patented Dec. 25, 1917.

Application filed August 16, 1917. Serial No. 186,593.

*To all whom it may concern:*

Be it known that we, JOSEPH W. REITER and CHARLES F. REITER, citizens of the United States, residing at Minneapolis, in the county of Hennepin and State of Minnesota, have invented certain new and useful Improvements in Automatic Self-Cleaning Rakes; and we do declare the following to be a full, clear, and exact description of the invention, such as will enable others skilled in the art to which it appertains to make and use the same.

This invention relates generally to garden implements, and more particularly to rakes.

The primary object of the invention is to provide a rake with a cleaner member which is yieldably mounted upon the rake and disposed adjacent the points or extremities of the teeth of the same so that when the rake is being used said member will be automatically moved to a position adjacent the other ends of the teeth and will automatically return to its normal position forcing the dirt or grass off of the teeth when the rake is raised from the ground.

Another object of the invention is to provide an ordinary short tooth garden rake with a self cleaning attachment which is made from a single length of wire by bending the wire sinuously to form loops which serve the same purpose as the rounded teeth on the back of an ordinary wire lawn rake.

A further object of the invention is to provide a self cleaner for rakes which may be readily and easily attached to almost any size and style of rake, and readily and easily removed therefrom, and which will not easily become broken or otherwise get out of order.

A still further object of the invention is to generally improve upon devices of this class by the provision of an extremely simple, strong, durable and inexpensive construction, one which will be efficient and reliable in operation and well adapted to the purpose for which it is designed.

With these and other objects in view, the invention consists of certain novel features of construction and the combination and arrangement of parts as will be hereinafter fully described and claimed.

In the accompanying drawings forming a part of the application, and in which similar reference characters are used to designate like parts throughout the several views, Figure 1 is a top plan view of a device constructed in accordance with this invention.

Fig. 2 is a side view of the same;

Fig. 3 is an end view of the clamp; and

Fig. 4 is a side view of the attachment applied to a rake.

Referring more particularly to the drawings, an ordinary tooth garden rake is shown, said rake consisting of a rake head having a plurality of teeth $a$ and a suitable handle $b$ to which the head is attached. Mounted upon the handle $b$ is a clamp 1 which is of improved construction consisting of three parts, 2, 3, and 4. The part 2 surrounds substantially one-half of the circumference of the handle, while the parts 3 and 4 surround a little more than one-fourth of said circumference. These parts 3 and 4 have staggeredly arranged fingers or projections 5 on their inner edges, the fingers of one of the parts fitting between those of the other as clearly shown by the drawings. In this manner the clamp is adapted to fit handles of different shapes and sizes.

The outer edges of the parts 3 and 4 and the edges of the part 2 are provided with flanges 6 having registering longitudinally extending grooves 7 therein, the purpose of which will be presently described. Extended through these flanges 6 are bolts 8 by which the parts of the clamp are connected and maintained in tight engagement with the handle of the rake.

The reference numeral 9 designates as a whole a cleaner member. This member 9 comprises a wire bent sinuously to form a series of loops 10, which receive the teeth of the rake therebetween at a point adjacent their connecting portions 11. As shown clearly by Fig. 4 of the drawings these loops are all disposed in the same plane which is inclined outwardly and downwardly with respect to the rake teeth. Formed in the wire adjacent the outermost loops are eyes 12, the said eyes being adapted to receive the outermost teeth.

The wire is then extended backwardly and inwardly in converging relation from the member 9 and has its ends received in the registering grooves 7 of the flanges 6 and clamped between these flanges by the bolts 8. It is of course, to be understood that the clamp 1 is adjustable longitudinally with respect to the handle $b$ so that the member 9 will be arranged with respect to the teeth $a$ as above described.

The member 9 is normally positioned adjacent the points or free extremities of the teeth, spring coils 13 being arranged in the extended portions of the wire for this purpose. When in this position, the loops 10 project below the points of the rake teeth so that as the rake is engaged with the ground when being used, the loops will first strike the ground and the cleaning member will be moved upwardly. Thus when pressure is removed from the loops 10 by raising the rake from the ground the cleaner member will return to its normal position under the tension of the spring coils 13 and the rake teeth will be automatically rid of grass and other undesirable matter.

It will be seen that in view of the fact that the loops 10 have rounded extremities and are normally disposed below the ends of the rake teeth, the device when attached to sharp tooth garden rakes will serve as such and also serve the same purpose as the rounded teeth on the back of a wire lawn rake. It will also be seen that the device can be readily and easily attached to different sizes and makes of rakes and removed therefrom and there is nothing in the construction of it to easily break or get out of order.

From the foregoing description taken in connection with the accompanying drawings, the construction, use and operation of the device will be readily understood without a more extended explanation.

As various changes in form, proportion, and in the minor details of construction, may be resorted to without departing from the spirit of this invention, it is to be understood that we do not wish to be limited to the construction herein shown and described.

We claim:—

1. The combination with a rake of a cleaner member comprising a wire bent sinuously to form a series of loops to receive the teeth of the rake from between at a point adjacent their connecting portions, said loops being inclined outwardly and downwardly with respect to said teeth from their connected to their free ends, eyes formed in said wire adjacent the outermost loops to receive the outermost teeth, said wire being then extended backwardly and inwardly from said member and secured at its ends to the handle of the rake, and spring coils formed in the extended portions of said wire to normally maintain said member adjacent the points of said teeth and permitting it to yield when pressure is applied to the outer ends of said loops.

2. The combination with a rake, of a three-part clamp mounted upon the handle thereof, one part of said clamp surrounding substantially one-half of the circumference of said handle, and the other parts surrounding slightly more than one-fourth of said circumference and having staggeredly arranged fingers on their inner edges, the fingers of one of said other parts fitting between those of the remaining other part, flanges formed on the other edges of said other parts and on the edges of the first mentioned part and having registering longitudinally extending grooves therein, bolts extending through said flanges, arms having one of their ends received in said grooves and clamped between said flanges, a cleaner member secured to the other ends of said arms, said member being normally disposed adjacent the points to the teeth of the rake and having a portion projecting below the same, and a means for maintaining said member in its normal position and permitting it to yield when pressure is applied to said projecting portion.

In testimony whereof we have hereunto set our hands in the presence of two subscribing witnesses.

JOSEPH W. REITER.
CHARLES F. REITER.

Witnesses:
GEORGE S. STEDMAN,
WILLIAM M. DANIELSON.